Dec. 8, 1964  J. PAVLECKA  3,160,249
LINEAR INTERLOCKING KEY OR SPLINE
Filed April 22, 1960
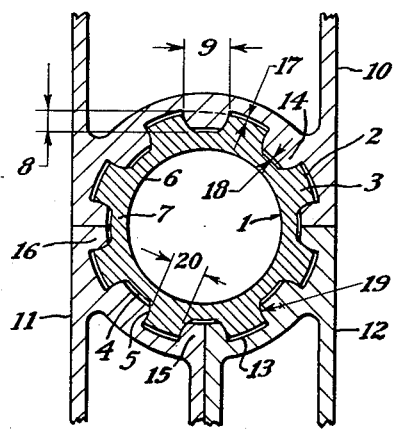
fig. 1.
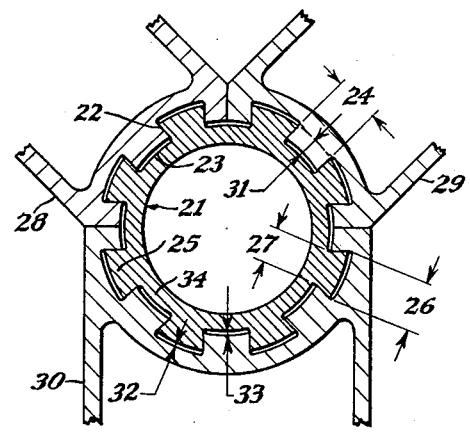
fig. 2.
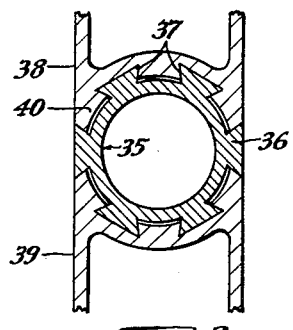
fig. 3.
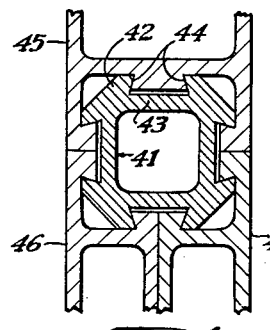
fig. 4.
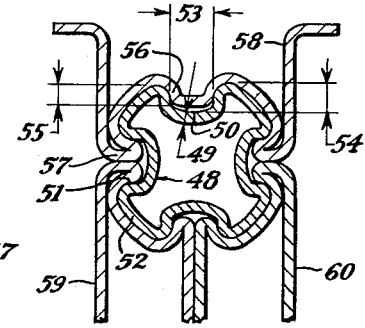
fig. 5.
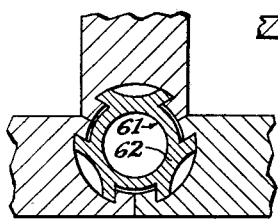
fig. 6.
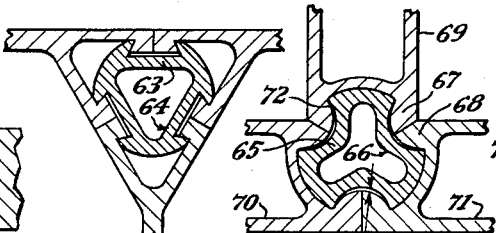
fig. 7.
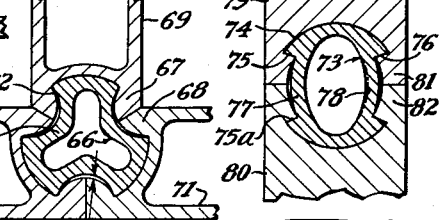
fig. 8.
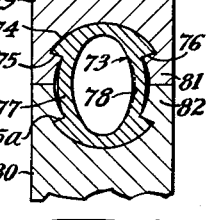
fig. 9.
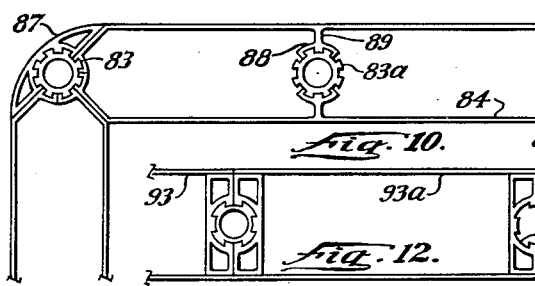
fig. 10.
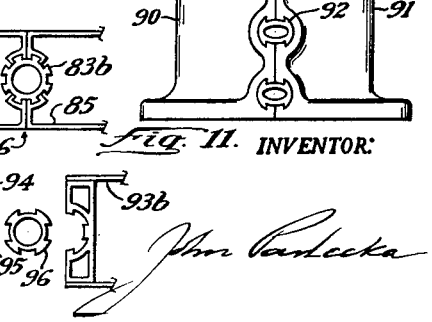
fig. 11.  INVENTOR:
John Pavlecka
fig. 12.

United States Patent Office 3,160,249
Patented Dec. 8, 1964

3,160,249
LINEAR INTERLOCKING KEY OR SPLINE
John Pavlecka, 8797 Capital, Oak Park, Mich.
Filed Apr. 22, 1960, Ser. No. 23,994
13 Claims. (Cl. 189—36)

This invention relates to linear keys or splines for joining two or more of machine parts or structural members laterally to each other, or for doweling them to each other in accurate lateral alinement, by engaging interlockingly segmental tenoned sockets in them; more particularly, this invention relates to a novel and useful form for such keys for an effective engagement with the parts or members and for maximal strength in transverse tension and in torsion.

The key or spline of this invention was disclosed first in my abandoned applications for Interlocked Panel Structure, Serial Nos. 265,317 and 295,997, filed January 7, 1952, and June 27, 1952, respectively, of which applications my pending application Serial No. 32,509, filed May 26, 1960, and bearing the same title, is a continuation-in-part.

Linear keys or splines for interlocking and doweling parts side-to-side have been proposed with a profile consisting of two or more tenons or lobes, fitted into mortises in the parts to be joined; the term "linear" refers to keys or splines the cross-sectional configuration and size of which are constant throughout the interlocking portion of their length, or even beyond it, so that the key or spline engagement with segmental sockets on the interlocked parts or members is a slidable one, and the key or spline can be produced by extrusion or by drawing through a die; this manner of joining parts has not hitherto been used extensively, the retarding factor in the art being absence of keys capable of performing satisfactorily the interlocking or doweling functions; the deficiencies of the existing keys lie in that their profile has a poor strength both in transverse tension and in torsion; for lateral doweling purposes, i.e., for constraining two parts together in a side-to-side alinement, the keys must be inserted with either a push fit or a press fit; the existing keys are ill adapted for this application either because their engagement with the parts takes place at oblique or round surfaces, or because their fit in the parts comes out either too loose or too tight due to variations in manufacturing tolerances, thereby hindering their use in low cost quantity production, or even in specific applications where a dependable union is vital.

One of the objects of my invention is to devise a family of linear interlocking and doweling keys or splines of a profile embodying certain basic principles and proportions for a most effective engagement with associated machine parts or structural members, whereby keys or splines of a large number of species of such a profile can be formed accordingly to suit different applications.

Another object is to devise certain basic proportions for linear interlocking and doweling keys or splines which make them best suited for the forces acting upon them, i.e., keys having adequate strength in transverse tension as well as in torsion so that they can secure parts together relatively immovably and thereby cause them to coact with each other as a unitary stress member in a structure or machine.

Yet another object is a linear interlocking key or spline suitable for doweling parts to each other laterally with preloading forces, its walls subject to transverse tension being arched to possess springiness, thereby effecting a union of the parts by clamping forces resiliently applied to them by the key or spline. Keys or splines embodying this construction can hold parts together in place of bolts and nuts, or adhesives, when made either of metal for machine applications, or of more elastic materials such as synthetics or plastics for applications such as wall structures, furniture, etc.

A further object is a hollow profile for a linear interlocking and doweling key or spline wherein all the material is disposed at the key periphery for maximum strength in torsion, wherein the walls are generally of a uniform thickness to eliminate stress concentration, and wherein contact with the associated parts takes place at mortise and tenon flanks substantially normal to the key periphery for a most effective engagement and maximum resistance to the twisting moment on the key.

The linear interlocking and doweling key of my invention may be made of any metallic sheet material suitable for rolling into a hollow section, or of materials such as aluminum and plastics suitable for extrusion, depending upon each particular application; for use in house walls it may be made of a synthetic material of low heat conductivity to function as an insulator against heat flow through a wall; it has a grooved or mortised profile, and is preferably hollow so that its material is disposed close to its periphery where the key is subjected to stresses; to obtain this result, the key mortises are made relatively shallow, thereby giving rise to tenons of low height between them; this accomplishes the further useful result of subjecting the tenons to shear rather than to bending. Locating the mortise bottoms furthest away from the key center not only increases the section modulus of the key profile but reduces the torsional stresses due to their application to the material at the key periphery; such a key can have relatively thin walls by providing a large center opening with consequent reduction of its weight; these results become most advantageous when the depth of the key mortises is approximately equal to one half of their width, or to even less than that.

Another principle embodied in the key resides in that its contact and engagement with the parts around it take place at the flanks of its mortises and tenons only, at and next to the periphery of the key; to this end, the mortise and tenon flanks are either flat or slightly concave, and in either case substantially normal to the key periphery so that contact and engagement with the parts take place at the maximum radius of the key and at nearly or exactly right angles to it.

The key flanks provide surfaces for a slidable lengthwise contact between the parts and the key and for centering them around the key as well as for a relatively immobile angular engagement therewith; to this end, the flat or concave flanks are disposed or directed to impart a reentrant shape to the key tenons, i.e., to undercut them so that they are narrower below the key periphery than at it; the resulting reentrant tenons may have either a dovetail shape or a concave meniscus shape.

The foregoing principles and proportions of the key configuration for maximal torsional and transverse tensile strength render it suitable for applications previously not contemplated; such a key can join two or more parts relatively immovably without reliance on other means for that result, and such parts become virtually a single member and coact as such through the key; for this function the key is fitted into the associated parts as a dowel with a push fit, or even with a press fit. In order to obviate extreme accuracy in obtaining such a close fit, and to stress the key section within the elastic limit of its material and yet make it clamp together the parts with its highest potential force, another innovation is embodied in the key of my invention; it resides in that the mortise bottoms are formed to follow a curvilinear path between the flat or concave mortise and tenon flanks, and the wall thickness at the mortise bottoms is only as thin as consistent with the elastic strength of the key material; upon pressing such a key into engagement with the associated parts of a machine or structure, its curvilinear walls are subject to tension, and their curvature is reduced resiliently thereby; the parts are thus held together by an elastic clamping hold of the key on them due to its distended springy walls.

Numerous embodiments of the foregoing principles of the new key or spline configuration can be derived for different applications, one variable factor in such embodiments being the number of the key mortises and tenons; certain such embodiments of the key are illustrated in the drawing which forms an integral part of this specification, and in which:

FIG. 1 is a sectional profile of a key having eight mortises and tenons in engagement with three members of a machine or structure, the key mortises and tenons having concave flanks.

FIG. 2 is the profile of a key and of three members locked into unity thereby, which profile represents most of the preferred principles of construction hereinabove disclosed, including tenons of dovetail shape.

FIG. 3 is the profile of a key or lateral dowel bearing six tenons and mortises, each of two associated members engaging two of the tenons.

FIG. 4 is the profile of a linear key or dowel employing four tenons and four mortises for interlocking three parts relatively immovably.

FIG. 5 is the profile of a four-mortise key in engagement with three structural members, the key being used as a dowel in holding the members together by resiliently applied forces due to curvilinear bottoms of the key mortises.

FIGS. 6 and 7 are key profiles having three tenons and mortises each, in engagement with a like number of structural parts.

FIG. 8 is the profile of a three-mortise key or spline in engagement with three structural members, the mortise bottom walls being curvilinear and being sprung to exert preloading forces on each two of the members to constrain them relatively immovably.

FIG. 9 is the profile of a two-mortise key suitable for doweling together parts laterally; its curvilinear mortise bottom walls are distended to cause the key to engage two structural or machine parts with resilient preloading forces.

FIG. 10 is a plan view of a hollow wall of a van, cabinet, building, etc., as an example of a useful application of the new interlocking key.

FIG. 11 is the lower portion of a machine base or of a column consisting of two halves which are doweled together by a key such as shown in FIG. 9.

FIG. 12 is another example of a hollow wall structure assembled to cellular units by means of keys telescoped inbetween their ends.

The key 1 shown in FIG. 1 is characterized by its profile which is constant throughout its length; the latter may be of any extent. The key profile consists of a number—eight in this case—of peripheral lands 2 which are angularly equidistant portions of a geometrical figure, a circle in this case; between these lands extend lengthwise mortises, formed by extruding or drawing the key, which give rise to tenons 3 under the peripheral lands. The mortises are delineated by a bottom 4, and two flanks 5; the bottom is a portion of a geometrical figure—a circle in this case—concentric with the peripheral figure, and is only relatively little smaller than the latter figure, thereby producing shallow mortises.

The shallow mortises allow all of the key material to be disposed at or near the key periphery for a maximum section modulus and radius of gyration; since material located around the central portion of the key contributes little to its sectional properties and strength, it is eliminated by an opening 6. The circular shape of this opening results in walls 7 of substantially uniform thickness under the mortise bottoms 4, and by making the walls as thin as consistent with the stresses in them it becomes practicable to employ a relatively large size for the opening.

One of the objects of the shallow mortises is to cause the resultant low key tenons 3 to be stressed in shear rather than in bending across their root portion, the strength of most materials being considerably higher in shear than in bending, i.e., in tension or compression. To this end, and in order to obtain adequate engagement at the flanks 5 with the keyed-together parts, the optimum ratio of the mortise depth 8 to the mortise width 9 is about one half, or may be even less; in other words, the keys function best with mortises about twice as wide as deep.

The associated parts 10–11–12 which the key 1 engages are formed each with a segmental tenoned socket; this socket consists of a basic cove face 13 and a number of lengthwise tenons 14 extending intermediate its edges, and two marginal half-tenons 15 and 16 at and along the edges; the tenons have a profile conforming to the key mortises, and the half-tenons amount each to one lateral half of a full intermediate tenon; because of the aforementioned optimum ratio of the mortise width being about double the depth, the half-tenons 15 and 16 are about as tall as they are wide in this and in all the following embodiments, for affording adequate strength both in bending and in shear. When engaging the key, each two of the parts 10–11–12 combine their half-tenons in one key mortise whereby each part obtains a hold on as wide a segment of the key as possible.

An important principle embodied in the key of FIG. 1 and in all of the other herein disclosed key profiles resides in that the engagement between the key and the associated parts takes place only at the mortise and tenon flanks 5; the key peripheral lands 2 and the socket cove face 13 are separated from each other by a clearance 17, as are the mortise bottoms 4 separated from the socket tenons 14 and half-tenons 15 and 16 by a clearance 18. The sockets of the associated parts 10–11–12 are thus centered around the key by their contact at the mortise and tenon flanks 5 only; these flanks are concave by being formed to a radius 19 which has its center somewhat below the key periphery; the direction of the flanks 5 at the periphery is thus substantially normal to it, resulting in square corners at the tenon width 20; external forces on the parts 10–11–12 are thus applied laterally against the tenons at their periphery corners and in proximity thereof.

The engagement of the key with the parts at the mortise and tenon flanks being relied upon to render them relatively immobile angularly, the parts need not be in contact or abutment with each other at the faces on their half-tenons 15 and 16, although such abutment will contribute to their immobility and coaction as a unitary stress member.

The key 21 of FIG. 2 shows a modified construction in that its mortise flanks 22 are flat between the key periphery and the mortise bottoms 23, and are parallel with each other for a constant mortise width 24 so that tenons 25 acquire a dovetail shape of a width 26 greater at their crest than their width 27 at their root for an effective interfit with associated members 28–29–30. The mortise depth 31 conforms to the proportion established in relation to the key of FIG. 1 by being about one-half of the width 24; similarly, the engagement between the key and the parts takes place only at the mortise and tenon flanks 22, all of the other opposite surfaces being separated by annular clearances 32 and 33. A relatively large circular opening is made possible by the shallow mortises and the thinness of walls 34 under the mortise bottoms 23. While only four parts could be locked together at the most by the key 1 of FIG. 1 because of only moderately undercut tenons 3, the dovetail shape of the tenons 25 of FIG. 2 allows as many as eight parts to be interlocked by the key 21, each with one tenon.

In FIG. 3 is shown a six-mortise key 35 which employs a basic hexagonal peripheral shape; its six tenons 36 have flat crests and a dovetail shape, and the interlaying mortises have parallel flanks 37.

All of the other characteristic features of the preceding two key configurations are present in the key 35, such as the flat flanks and corners formed thereby at the key periphery, contact and engagement of the key with the parts 38 and 39 limited to their mortise and tenon flanks, and uniformly thin walls at the mortise bottoms; each of the parts 38 and 39 has a segmental socket in it with three tenons 40 and no marginal half-tenons, the sockets engaging non-contiguous segments of the key.

A four-mortise key 40 with a basic octagonal shape and four dovetail tenons 42 is shown in FIG. 4, the mortises also having a dovetail shape; a square opening through the key in combination with flat mortise bottoms results in uniformly thin walls 43; the mortise and tenon flanks 44 form corners at the key periphery, and contact and engagement with the associated parts 45–46–47 take place at these flanks to the exclusion of the mortise bottoms and of the key periphery.

The four-mortise key 48 of FIG. 5 is significant in that its walls are of uniform thickness 49 not only at the mortise bottoms 50 but at the tenon flanks 51 and at crests 52 as well for uniformity of stress distribution and optimum utilization of material. Such a key can be formed by rolling from a round tube, with an inevitable concession in that it is impractical to make the flat mortise and tenon flanks 51 reach all the way to the key periphery and form corners thereat; instead the flat flanks provide a constant width 53 of mortises close to the periphery before merging along radii into it.

Another modification resides in that the mortise bottoms 50 have a depth 54 somewhat greater than one-half of their width 53, but the depth 55 of the engagement at the flanks conforms to this ratio; the increased mortise depth is due to the bottoms 50 following a concave path with the object of making the thin walls thereat yieldably extensible by a reduction in their curvature when subject to transverse tensile forces; such forces originate by causing the key mortises to engage tenons 52 and half-tenons 57 of the associated members 58–59–60 with an interference fit; by a minute straightening out of their arched shape, the mortise bottoms 50 prevent binding and seizing of the mortise and tenon flanks at assembly while exerting resiliently clamping forces on the associated members through their tenons 52 and half-tenons 57.

The next three figures represent three-mortise keys or splines all of which have a basically circular periphery, dovetail tenons, a substantially uniform wall thickness in the first two of the keys, and a non-uniform wall thickness in the last one for a specific purpose; other distinguishing features include convex walls 62 at the mortise bottoms of key 61 of FIG. 6, straight walls 63 in the key 64 of FIG. 7 produced by a triangular central opening, and concave walls 65 in the key 66 of FIG. 8; the pronounced curvature of the walls 65 renders the latter key suitable for use as a lateral dowel due to springiness of the walls when subject to transverse tension, similarly as in the key of FIG. 5.

The key 66 engages half-tenons 67–68 of the associated members 69–70–71 at the periphery corners of its concave flanks 72 by virtue of the curvature of these flanks being deeper than that of the half-tenons; the resulting clearance 33a is at its maximum inwardly away from the key periphery, the flanks and the mortise bottoms being half-circles the center of which lies on a radius somewhat smaller than that of the key periphery, while the center of half-tenons lies approximately or exactly on the key periphery; this clearance—shown on an exaggerated scale—allows the walls 65 to flex when subject to distending forces applied between the opposite key flanks 72 due to an interference fit with the half-tenons 67–68. The walls 65 are somewhat thicker in their portion close to the key center in order to compensate for heavier stresses thereat due to bending to which they are subject by the forces acting upon the flanks 72; by their springiness these walls exert preloading clamping pressure upon the associated members 69–70–71 without necessity of a press fit and consequent precision fabrication, and difficult assembly or disassembly. These results are obtained with the same optimal ratio of the key mortises being about half as deep as wide as in most of the preceding embodiments.

The same principles and proportions of profile configuration as in the preceding embodiments distinguish the two-mortise key or spline 73 of FIG. 9; the key peripheral lands 74 are circular, and the tenons under them have a dovetail shape between flat engaging flanks 75 and 76, these flanks forming corners at the key periphery by being substantially normal to it. The mortise bottoms 77 are of a uniform thickness which derives from an oval central opening coaxial with the peripheral lands 74 and with the mortise bottoms.

The key 73 is particularly suited for a lateral dowel in that its walls 77 are formed in their free state with a convexity as indicated by dotted line 78, drawn to an exaggerated scale; when the key is forced into parts 79 and 80, a tight engagement between its opposite flanks 75 and 75a and half-tenons 81–82 of the parts induces tension in the walls 77, thereby reducing their curvature to the shape as shown by solid lines; this tension manifests itself as a resilient clamping pressure on the parts 79–80.

The keys disclosed in the foregoing embodiments are useful for locking together two or more parts of a machine or structure by either a push fit or a press fit in them, with corresponding degree of relative immobility; the resultant assembly may be easily demountable, or it may be doweled together permanently, as desired; FIGS. 10–12 illustrate both such applications.

In FIG. 10 a hollow wall structure is assembled by means of keys or splines 83 of the type shown in FIG. 2; the principal components are panel units 84 and 85 which meet at parting lines 86 in opposite rows, and auxiliary components such as a post 87; the panel units and the post carry key-engaging segmental tenoned sockets 88; two of such sockets engage key 83a, four engage key 83b, and five engage key 83 congruently with each other. The keys, together with stringers 89 on the panel units, and with the post 87, and with the sockets 88 carried by the stringers and the post, provide stress members in the wall at spaced intervals.

In FIG. 11 is shown a base of a machine, or of a column, which is made up of two halves 90–91 doweled laterally to each other in precise alinement by keys or splines 92 to form a unitary body; the keys employed are of the type shown in FIG. 9.

Another wall structure is shown in FIG. 12; it employs cellular units 93 which are formed of side panels and stud members 94, the latter including segmental tenoned sockets 95 at the ends of the cells; cells 93–93a–93b are alined end-to-end when their sockets engage keys 96 to form a continuous hollow wall and studs therein.

I claim the following as my invention:

1. A linear key or spline, a number of parts or members around the periphery of said key, a number of mortises and tenons therebetween extending lengthwise on said key, said flanks having a shape imparting a reentrant section to said tenons at the key periphery, each of said parts having flanks astride at least one of said key tenons and matching said tenon flanks, said key being in a flank-to-flank slidable contact and engagement with said parts and being out of contact therewith at said key periphery and in said mortises.

2. A linear key or spline, tenons and interjacent mortises extending lengthwise on said key, at least two parts or members laterally contiguous with each other around said key, each part fitting into the key mortises astride at least one of said tenons, said tenons being reentrant at and next to the key periphery, said mortises having bottoms between the reentrant portions of said tenons of a depth substantially one half of their maximal width, said key having a constant cross-section of said tenons and of said mortise depth-to-width relationship throughout the effective length thereof, and said parts being in a lengthwise slidable contact with said tenons at and next to the key periphery and being out of contact at said mortise bottoms.

3. A linear key or spline, at least two parts or members spanning radially adjoining segments of said key, tenons and mortises and flanks common thereto extending lengthwise on said key, said flanks having directions imparting a reentrant shape to said tenons at and next to the key periphery, said mortises having a maximal depth substantially one half of their maximal width between said flanks, said key having a constant cross-section and said mortise depth-to-width relationship throughout the effective length thereof, each of said parts being in a lengthwise slidable contact with said flanks astride at least one tenon and being centered and angularly engaged thereat for subjecting said key to forces at and next to the periphery thereof, and being out of contact at said mortises.

4. A linear key or spline and parts or members as set forth in claim 3, said key being hollow and having the walls thereof at said mortises as thin as consistent with the elastic strength of the key material under said forces at and next to the periphery thereof.

5. A linear key or spline and parts or members as set forth in claim 3, said key flanks being concave and being located to undercut said tenons for imparting said reentrant shape thereto, and said parts having convex flanks thereon conforming to said key flanks.

6. A linear key or spline and parts or members as set forth in claim 5, said key periphery corresponding to a basic geometrical figure, and said key concave flanks being arcs of circles having the center thereof located within said peripheral figure and in proximity thereof.

7. A linear key or spline having a central opening therein, lengthwise tenons and interjacent mortises on said key, at least two segmental sockets in a slidable mortise-and-tenon engagement with said key, said sockets adjoining each other laterally in at least one of said key mortises and being in a tight engagement with the tenons therealong, walls around said opening at said mortises between said tenons, said walls being arched between said tenons and being of a section so thin as to be resiliently extensible by a reduction of the arch thereof due to said tight engagement of said sockets with said key tenons.

8. A linear key or spline of a hollow cross-section, lengthwise tenons and mortises and flanks therealong extending on said key, at least two parts or members in a slideable engagement with segments of said key, said parts being jointly in engagement with said flanks along one of said mortises and having an interference fit with said flanks, walls connecting said flanks and forming said mortises therewith, said walls being of a bowed section and being of a predetermined thinness proportioned to resist yieldingly tensile forces imposed theron by said interference fit.

9. A linear key or spline, a number of parts or members bearing segmental sockets and therewith spanning each a portion of the key periphery, lengthwise tenons and mortises extending on said key and in said sockets, matching flanks on said key and socket tenons and mortises in engagement with each other, each two adjoining of said sockets having the marginal tenons thereof in engagement with the flanks along one key mortise, said engagement being an interference fit, and resiliently yieldable means as a part of the cross-sectional construction of said key for allowing said socket and key interference engagement to be effected slidably.

10. A linear key or spline, a number of parts spanning segments of said key and adjoining each other laterally, a number of pairs of opposite flanks in said key, each pair of said flanks engaging two of said parts and being in a forced fit therewith, a wall connecting said flanks in each pair with each other, said wall being arched and being of a relatively thin section proportioned to be reduced resiliently in the curvature of the arch thereof by transverse tensile forces imposed thereon by said forced fit of said flanks with said two parts.

11. A linear key or spline, a number of radially adjoining parts spanning complemental segments of said key, said key being hollow and having a number of peripheral lands, lengthwise mortises extending between said lands, said mortises having flanks undercutting said lands and having bottoms and walls thereat between said flanks, said bottoms and walls following a curvilinear path and said walls being relatively thin, said key engaging each two of said parts jointly in a mortise with an interference fit at said flanks, said interference fit subjecting said mortise bottoms to forces tending to straighten out said curvilinear path thereof by a resilient deformation of said walls thereat.

12. In a linear key or spline for doweling a number of adjoining parts to each other, lengthwise mortises and tenons therebetween in said key, said mortises and tenons having flanks directed to undercut said tenons at the key periphery, said mortises having bottoms following a curvature between said flanks, and walls at said mortise bottoms of a section proportioned to be as thin as to yield resiliently in curvature when said flanks are in a forced fit with each two of said parts in a mortise for exerting clamping forces on said parts due to the elasticity and to said curvature of said mortise bottom walls.

13. In a key or spline for doweling two machine parts or structural members laterally and relatively immovably to each other, two lengthwise mortises extending in said key, said mortises having flanks substantially normal to the key periphery in proximity thereof and having bottoms of an arched shape between said flanks, said key having an opening therein of a shape such as to produce walls of a predetermined thinness at said bottoms for an elastic deformation thereof when said key is pressed into engagement at said flanks thereof with both of said parts or members in each of said mortises.

References Cited in the file of this patent

UNITED STATES PATENTS

| | | |
|---|---|---|
| 390,615 | Nye | Oct. 2, 1888 |
| 463,288 | Penwell et al. | Nov. 17, 1891 |
| 710,240 | Belfield et al. | Sept. 30, 1902 |
| 2,136,947 | Morgan | Nov. 15, 1938 |
| 2,161,138 | Cutting | June 6, 1939 |
| 2,571,318 | Warner | Oct. 16, 1951 |
| 2,888,283 | Dicken | May 26, 1959 |